(12) United States Patent
Murphy, Jr.

(10) Patent No.: US 6,274,054 B1
(45) Date of Patent: *Aug. 14, 2001

(54) BIOLOGICAL AND ALGAE CONTROL METHOD AND DEVICE

(76) Inventor: Edward L. Murphy, Jr., 677 Temple St., Duxbury, MA (US) 02332

( * ) Notice: Subject to any disclaimer, the term of this patent is extended or adjusted under 35 U.S.C. 154(b) by 0 days.

This patent is subject to a terminal disclaimer.

(21) Appl. No.: 09/503,288

(22) Filed: Feb. 14, 2000

(51) Int. Cl.[7] .............................. C02F 1/50; B01D 37/00
(52) U.S. Cl. .................. 210/764; 210/765; 210/774; 210/805; 210/167; 210/169; 210/205; 210/206; 210/195.1; 210/416.2; 210/501; 210/505
(58) Field of Search ........................ 210/749, 763, 210/764, 168, 169, 765, 774, 805, 167, 205, 206, 195.1, 416.2, 501, 505

(56) References Cited

U.S. PATENT DOCUMENTS 5,985,141 * 11/1999 Murphy, Jr. ...................... 210/168

* cited by examiner

Primary Examiner—Robert J. Popovics
(74) Attorney, Agent, or Firm—John P. McGonagle

(57) ABSTRACT

The method of the present invention is to pump contaminated water, either by pushing or drawing, through a particulate filter and then through a contact chamber containing firstly copper wool and secondly brass wool. This method may be applied to a wide number of applications in which water is subject to either algae or bacterial contamination.

6 Claims, 4 Drawing Sheets

BIOLOGICAL AND ALGAE CONTROL METHOD AND DEVICE

BACKGROUND OF THE INVENTION

This invention relates to fluid treatment, and in particular to a control system for treating biological and algae contaminants normally found in industrial, commercial and recreation water.

United States industries use substantial amounts of water for its various processes. Approximately 70% of the water used goes into cooling systems. As the United States economy continues to expand water use will also expand. Because of water resource constraints, industry's use of recirculated water will expand at an ever greater rate.

Recycled water generally has impurities and bacteria build up. In open cooling towers, the addition of bacteria and particulate matter is unavoidable due to the cooling tower being exposed to the open atmosphere. Non-treatment of recycled water leads to malfunctioning of the water system, costing industry billions of dollars annually in lost production, wasted energy and premature replacement of equipment, as well as creating a regional hazardous environment about the cooling towers.

In order to control the build up of toxic bacteria, such as Legionella, traditional water treatments systems employ biocides which, while effective, are difficult to handle due to their toxicity to humans. In addition, biocide use must be monitored either manually or with automatic instrumentation. Prior art treatment systems are also costly.

Not only do United States industries use substantial amounts of water for its various processes, this country's population also uses substantial amounts of water in recreation use. One of the biggest recreational uses of water is in swimming pools and spas. Swimming pools and spas will generally use a combination of filters and chlorination as a means of controlling bacteria in water. While the biocial properties of chlorination are effective to kill bacteria, the chlorine itself may be deliterious to other equipment as well as being uncomfortable for users in the swimming pools and spas. In addition excess chlorine in the water often imparts an undesirable taste and odor to the water. Effluent chlorinated water has also been deemed harmful to the environment by the EPA.

SUMMARY OF THE INVENTION

The present invention provides a method and filtration system which removes particulate matter, algae and bacteria in water. Applicant first devised techniques for reconditioning water soluble coolants in machine tools. See U.S. Pat. No. 5,985,141, "Coolant Reconditioning System", issued Nov. 16, 1999 to Applicant ("'141 patent"). Through experimentation, Applicant has found the principles of the '141 patent to also be effective in controlling a broad spectrum of algae, bacteria and fungi occurring in open recirculating cooling towers and air washers, as well as swimming pools and spas. The filtration system is a two part system providing initial filtration of particulate matter followed by biological treatment through a contact chamber with a brass wool and copper wool packed element. Applicant has found that substantially all bacteria and algae in the filtered water is eliminated. The use of brass wool and copper wool eliminates or greatly reduces the need for toxic biocides and chlorine solutions.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention. dr

DETAILED DESCRIPTION OF THE INVENTION

Figure 1:
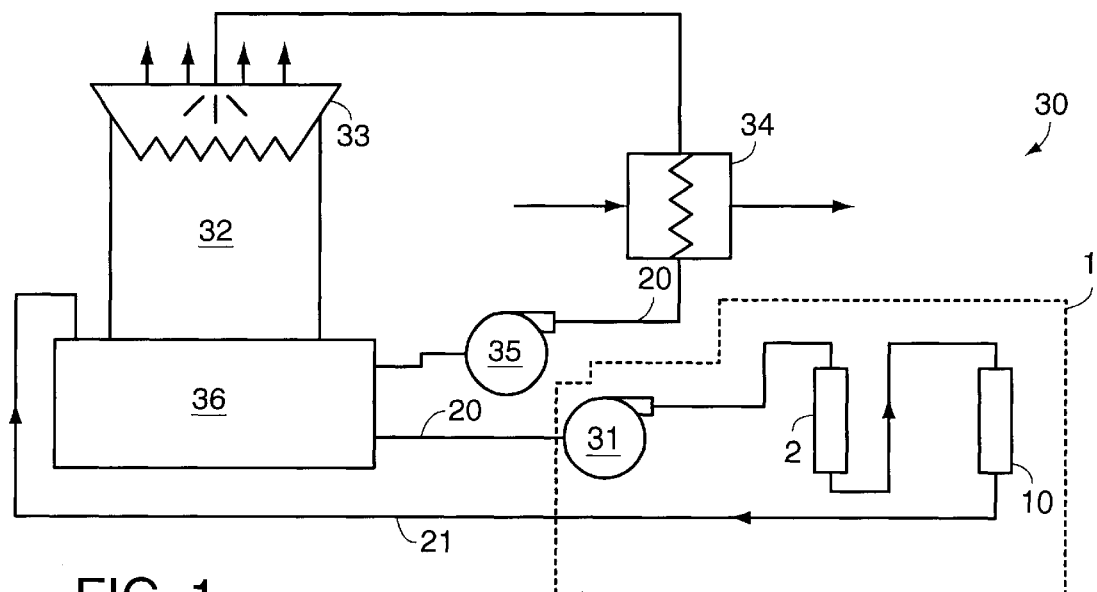
FIG. 1 is a schematic block diagram of one embodiment of a water conditioning system utilizing a separate pump system for a cooling tower.

Referring to the drawings in detail wherein like elements are indicated by like numerals, there is shown several embodiments of the invention incorporating a treatment system 1 constructed according to the principles of the present invention. The present invention provides a method for controlling biological contaminants and algae in water systems as well as actual devices for accomplishing the method. The treatment system 1 used in the method is a two part system comprised generally of an initial filter 2 for removing particulate matter from contaminated water 20 and a contact chamber 10 for eliminating algae and biological contaminants in the water 20.

Figure 2:
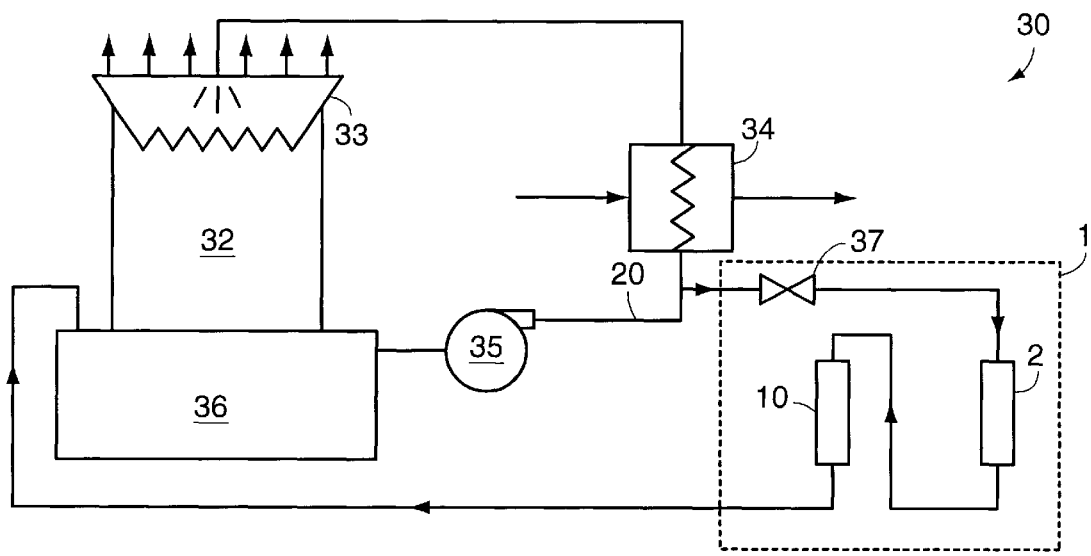
FIG. 2 is a schematic block diagram of another embodiment of a water conditioning system utilizing a side stream system for a cooling tower.

In FIGS. 1 and 2 the present invention is incorporated into a cooling water conditioning system 30. As shown in FIGS, 1 and 2, The cooling water conditioning system 30 is comprised generally of a cooling tower 32 with a top 33 out of which evaporated and contaminated hot water 20 emanates. The contaminated hot water 20 is fed into a heat exchanger 34 thereby reducing the heat in the water 20. The cooled water 20 is then moved by a pump 35 into a reservoir 36 for recycling. The cooling water conditioning system 30 shown in FIG. 1 has a separate pump 31 for operating the invention treatment system 1. Contaminated water 20 from the reservoir is moved by a pump 31 through a particulate filter 2 and then through a contact chamber 10 containing a brass wool 17 and copper wool filter 18 medium. Biological contaminants and algae are completely eliminated from the contaminated water 20. The resultant bacteria and algae-free water 21 is returned to the reservoir 36. In FIG. 2 a portion of the water 20 being pumped from the heat exchanger 34 to the reservoir 36 is intercepted by a recirculating valve 37 and a portion of the flow is passed through the invention treatment system 1. As in FIG. 1, the contaminated water 20 is passed through a particulate filter 2 and then through a contact chamber 10 for removal of biological contaminants and algae, whereupon the bacteria and algae-free water 21 is returned to the reservoir 36.

Figure 3:
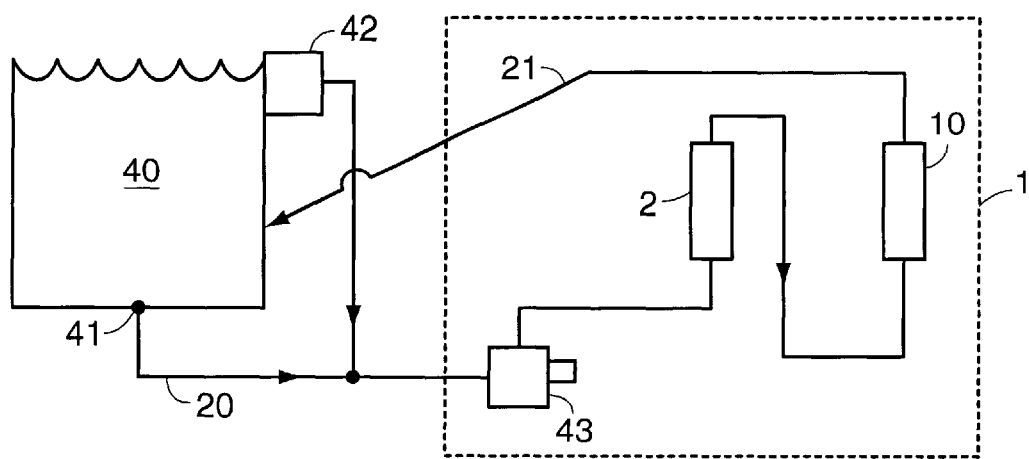
FIG. 3 is a schematic block diagram of an embodiment of a water conditioning system for a swimming pool/spa.

FIG. 3 illustrates the present invention applied to a swimming pool or spa 40. Water 20 is removed from the pool 40 either through the main drain 41 and or through a skimmer 42. The water 20 is drawn into the invention treatment system 1 by means of a pump and motor 43. The pump and motor 43 then pushes the water 20 through a particulate filter 2 and through the contact chamber 10 where algae and biological contaminants are eliminated, and the bacteria and algae-free water 21 is returned to the pool 40.

The invention particulate filter 2 may be of any conventional configuration. It may be a bag filter, cartridge filter, DE filter, a sand filter, or any other industry-accepted filter method.

Figure 4:
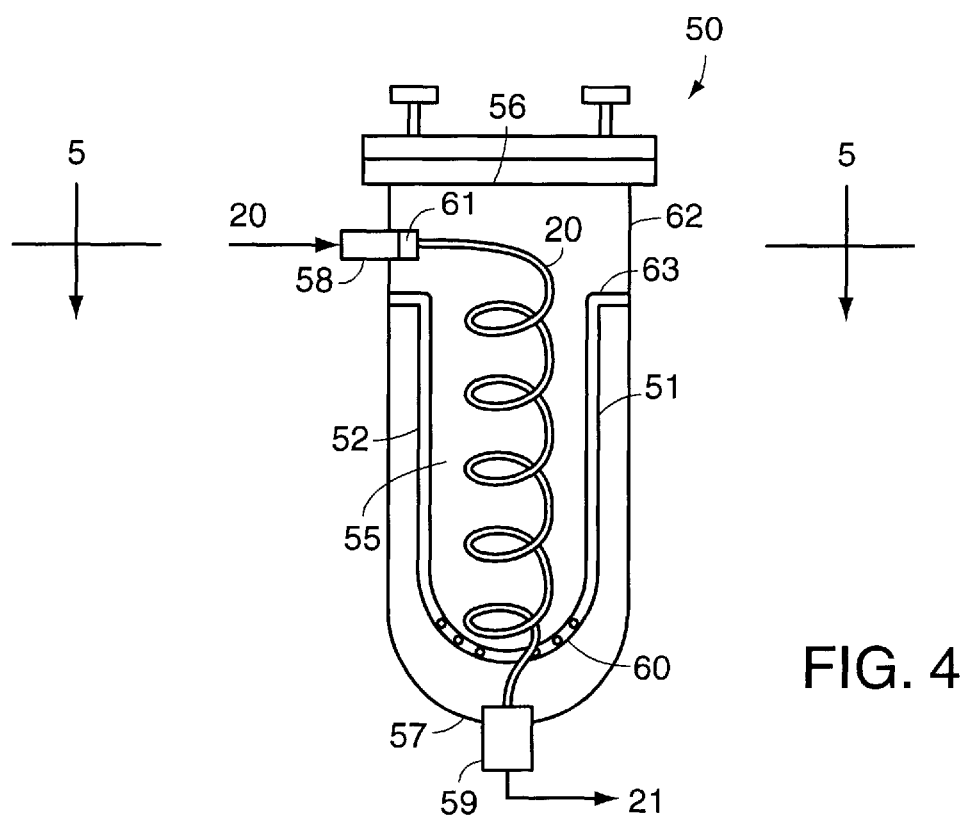
FIG. 4 is a cross-sectional diagram of water flow through one embodiment of the invention contact chamber.
Figure 5:
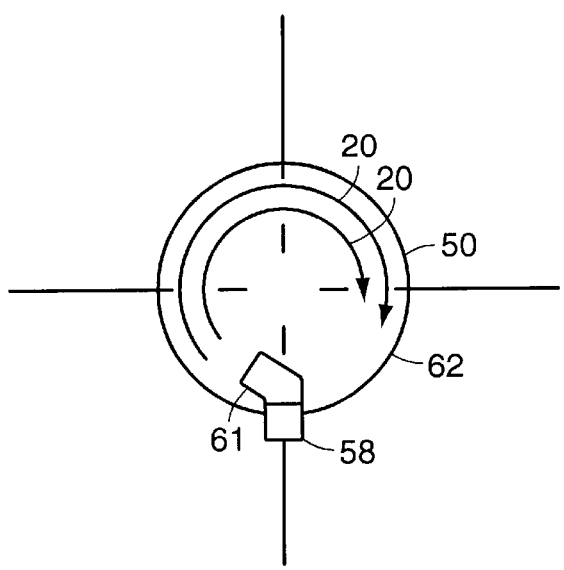
FIG. 5 is a view along the line 5—5 of FIG. 4.
Figure 7:
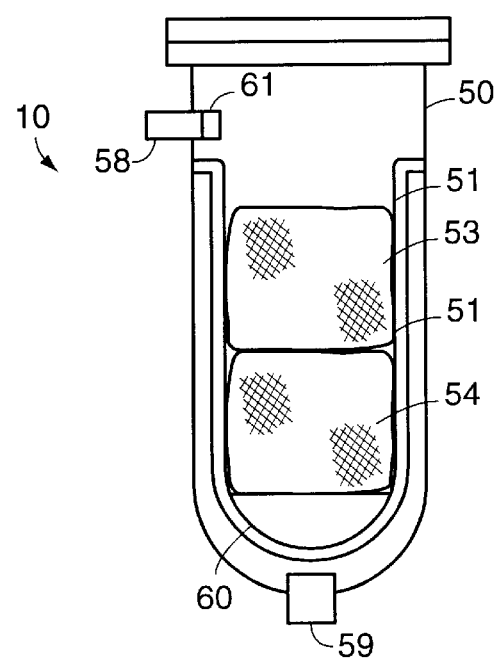
FIG. 7 is a view of the embodiment of FIG. 4 with filter bags added.

FIGS. 4, 5 and 7 illustrate one embodiment of the contact chamber 10. The contact chamber 10 is comprised of a standard industrial bag housing 50 in which a liner (bag) 51 is installed. The liner sides 52 are of a nonporous, flexible material that forces the water 20 to be treated to pass through the full length of the liner 51. The liner 51 has a an open top 63 and a porous bottom 60. The liner sides 52 define an interior 55. The liner interior 55 contains two porous, containment bags 53, 54, packed with copper and brass wool. Each containment bag 53, 54 has a porosity in the range of 200–400 microns. The housing 50 has a top 56 and a bottom 57. The housing 50 has an inlet 58 near to the housing top 56 for inputting water 20 to be treated. The bag 53 nearest the inlet 58 is packed with copper wool 18. The housing 50 has an outlet at the housing bottom 57 for outputting treated water 21. The housing inlet 58 has a 45° fitting 61 within the housing 50 which forces the water 20 to flow tangentially to the housing side wall 62 thereby creating a circular flow as shown in FIGS. 4 and 5. The circular flow enables the water 20 to have a longer contact time with the two treatment bags 53, 54 and media contained therein, thereby increasing the device's effectiveness.

Figure 6:
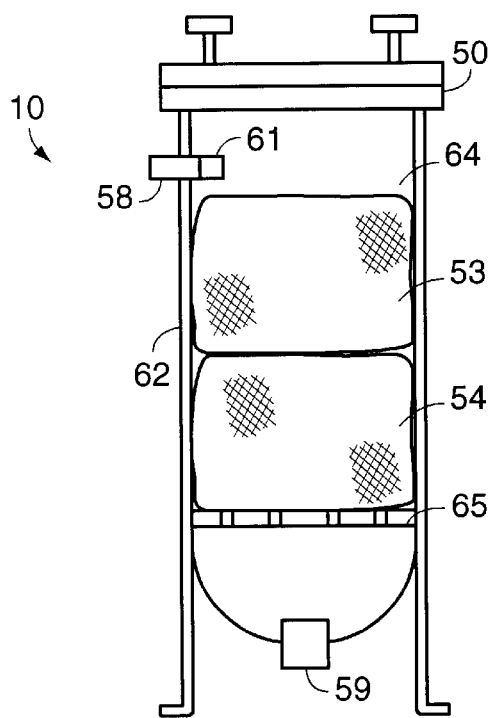
FIG. 6 is a schematic view of another embodiment of the invention contact chamber.

FIG. 6 illustrates another embodiment of the contact chamber 10. The contact chamber 10 is comprised of a solid wall, cylindrical vessel 50 having a top 56, bottom 57, side wall 62 and interior 64. The vessel 50 has an inlet 58 near to its top 56, said inlet 58 having a 45° fitting 61 within the vessel interior 64. The vessel has an outlet 59 at its bottom 57. Within the contact chamber vessel interior 64 are two porous filter bags 53, 54, one positioned vertically over the other. The top filter bag 53 is packed with copper wool 18. The bottom filter bag 54 is packed with brass wool 17. Within the vessel interior 64, near to the vessel bottom 57 but above the outlet 58 is a porous support plate 65 upon which the brass filter bag 54 rests.

Figure 8:
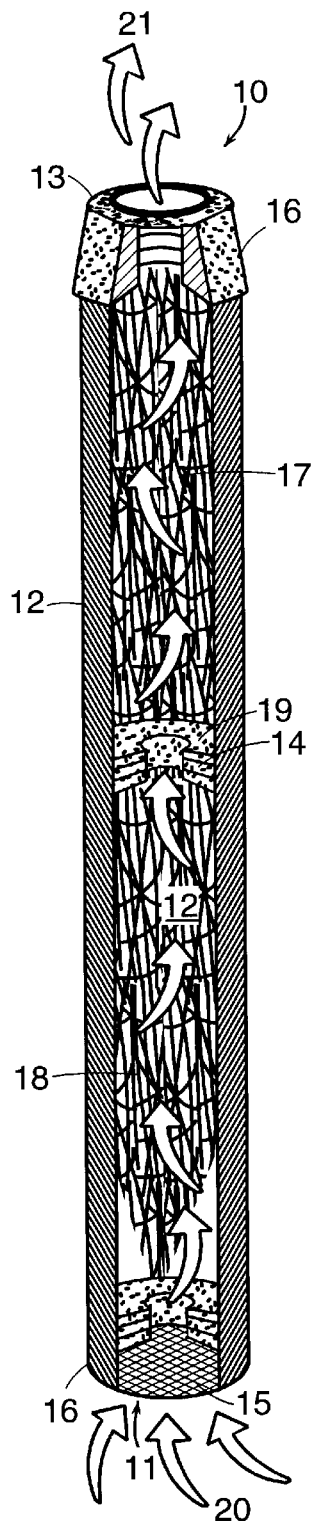
FIG. 8 is a schematic diagram of a contact chamber within the invention filter system.

In another embodiment of the invention shown in FIG. 8, the contact chamber 10 has a bottom 11 from which cylindrical side walls 12 extend vertically upward, said contact chamber 10 being generally cylindrical in shape, the longitudinal axis of said cylindrical contact chamber 10 being generally perpendicular to the bottom 11 of said element, said contact chamber 10 having a top 13 connected to said cylindrical side walls 12, said top 13, bottom 11 and side walls 12 defining a contact chamber interior 14. The bottom 11 has a retaining screen 15 attached thereto. A gasket seal 16 is attached to the contact chamber top 13 and bottom 11. The contact chamber interior 14 is packed with brass wool 17 and copper wool 18. In this embodiment of the invention the brass wool 17 is positioned vertically above the copper wool 18. A porous disk 19 is positioned within the contact chamber interior 14 in a plane transverse to the central, longitudinal, vertical axis of the contact chamber 10. The porous disk 19 prevents channelling through the contact chamber 10.

Contaminated water 20 to be treated enters the contact chamber interior 14 from the bottom 11 passing through the retaining screen 15. The water 20 upflows through the copper wool 18, porous disk 19 and brass wool 17 and exits through the contact chamber top 13 as bacteria-free and algae-free water 21. The copper wool 18 is highly toxic to bacteria, killing substantially all of the bacteria and algae in the water 20. The brass wool 17 is also highly toxic to bacteria, killing any remaining bacteria and also picking up any dissolved copper in the water stream.

The brass wool is a coarse grade with an average fiber width of 5 mils/0.005 inch. The copper wool is also coarse grade with a purity greater than 99.9%. In this embodiment of the invention, the brass wool 17 and copper wool 18 are packed in concentrations of 0.05±15% ounces per cubic inch. In this embodiment of the invention the filter media combination of brass wool 17 and copper wool 18 is 50% brass wool and 50% copper wool. The proportion of brass wool to copper wool may range from 25% to 75% of total filter media.

The treatment system 1 will generally be operated with a pump 4, 31, 35 which forces contaminated water 20 through a particulate filter 2, through the contact chamber 10, and out of the filter system as algae-free and bacteria-free water. The method of the present invention is to pump contaminated water, either by pushing or drawing, through a particulate filter and then through a contact chamber containing firstly copper wool and secondly brass wool. This method may be applied to a wide number of applications in which water is subject to either algae or bacterial contamination.

Applicant has tested for the same organisms as are identified in ANSI/NSF 50-1996 American National Standard/NSF International Standard. In one such test the results were as follows:

| Source | Enterococc/100 mL Method §230c.2.a | *Pseudomonas aeruginosa*/100 mL Method 9213E | Algae* |
| --- | --- | --- | --- |
| Before | 100/100 mL | 110,000/100 mL | >120,000/100 mL |
| After | 0/100 mL | 600/100 mL | 0/100 mL |

*Four Genera present were Ankistrodemus, Cryptomonas, Chlorococcum, and Bracteacoccus In previous tests, applicant found that the present invention was particularly effective in reducing anaerobic bacteria and staphylococcus. The following results were obtained.

| Source | Anaerobic/Facultative Plate Count CFU/mL | *Staphylococcus*/mL |
| --- | --- | --- |
| Before | 2,600,000 | 150,000 |
| After | 33,000 | 310 |

All of the above tests were performed in a dynamic test having the total volume of the test reservoir passing through the media a minimum of one pass.

It is understood that the above-described embodiment is merely illustrative of the application. Other embodiments may be readily devised by those skilled in the art which will embody the principles of the invention and fall within the spirit and scope thereof.

I claim:

1. A method for controlling biological and algae contaminants in water, comprising the following steps:

pumping contaminated water through a particulate filter;

pumping the filtered contaminated water through a contact chamber containing copper wool and brass wool.

2. The method as recited in claim 1, wherein:

passing the contaminated water in the contact chamber firstly through copper wool and secondly through brass wool.

3. The method as recited in claim 2, wherein said contaminated water is from a cooling water conditioning system, further comprising the steps:

providing a cooling tower with a top out of which evaporated and contaminated hot water emanates;

passing the contaminated hot water through a heat exchanger thereby reducing the heat in the water;

pumping the water from the heat exchanger into a reservoir for recycling;

pumping contaminated water from the reservoir through said particulate filter;

pumping the contaminated water from the particulate filter through said contact chamber;

pumping the water from the contact chamber back to the reservoir.

4. The method as recited in claim 3, further comprising the steps:

intercepting a portion of the water being pumped from the heat exchanger to the reservoir by a recirculating valve;

passing said intercepted portion of water through said particulate filter;

passing the water from the particulate filter through said contact chamber;

passing the water from the contact chamber to the reservoir.

5. The method as recited in claim 2, wherein said contaminated water is from a swimming pool, further comprising the steps:

drawing water from the pool by means of a pump;

pumping said drawn water through said particulate filter;

pumping the water from the particulate filter through said contact chamber;

pumping the water from the contact chamber back to the pool.

6. The method as recited in claim 2, wherein said contaminated water is from a spa, further comprising the steps:

drawing water from the spa by means of a pump;

pumping said drawn water through said particulate filter;

pumping the water from the particulate filter through said contact chamber;

pumping the water from the contact chamber back to the spa.

* * * * *